Feb. 8, 1938. A. C. PARKHURST 2,107,645
DRY FLY HOLDER
Filed March 19, 1937

INVENTOR
ARTHUR C. PARKHURST
BY
Martin E. Anderson
ATTORNEY

Patented Feb. 8, 1938

2,107,645

UNITED STATES PATENT OFFICE 2,107,645

DRY FLY HOLDER

Arthur C. Parkhurst, Denver, Colo.

Application March 19, 1937, Serial No. 131,816

4 Claims. (Cl. 43—1)

This invention relates to improvements in dry fly holders.

Fishermen often find it necessary to attach a gut leader to a dry fly hook and this is a difficult job when no means is at hand for holding the hook, as when fishing or in camp.

The hooks employed with dry flies are often very small and have exceedingly small eyes, and this makes it difficult to thread the leader through the eye. After the leader is in position in the eye it must be tied, which, in the absence of a suitable holder, is more difficult than the threading. The fine hairs or feathers comprising the wings are nearly always in the way when tying and if any of these are included in the knot or tie, it tends to destroy the usefulness of the fly.

It is the object of this invention to produce a simple and convenient holder for dry flies, that can be carried in the pocket without inconvenience and which is so constructed that it will firmly clamp a fly, and hold it in a convenient position for attaching a leader thereto.

Another object is to produce a holder that, besides clamping and holding a fly, shall also be provided with means for holding the bristles or feathers away from the eye so as to leave the latter clear and fully exposed to facilitate threading and which also assures that the feathers will not be incorporated in the tie.

A further object is to produce a device of the character described, in which means is provided for facilitating the tying and for guiding the leader to the rear of the eye of the hook.

A still further object is to provide a holder having means for clamping it to a support so that the operator may have both hands free to tie the leader.

The above and other objects that may appear as the description proceeds are attained by an arrangement and a combination of elements that will now be described in detail and for this purpose reference will now be had to the accompanying drawing in which the invention has been illustrated in its preferred form and in which.

The holder comprises a tweezer element having two clamping jaws 10 that are identical in size and shape except that one is a right and the other a left. The jaws are attached to each other at 11 and are outwardly flexed. The free ends are normally spaced apart in the manner common to tweezers.

Figures 1, 2, 3, 4, 5:
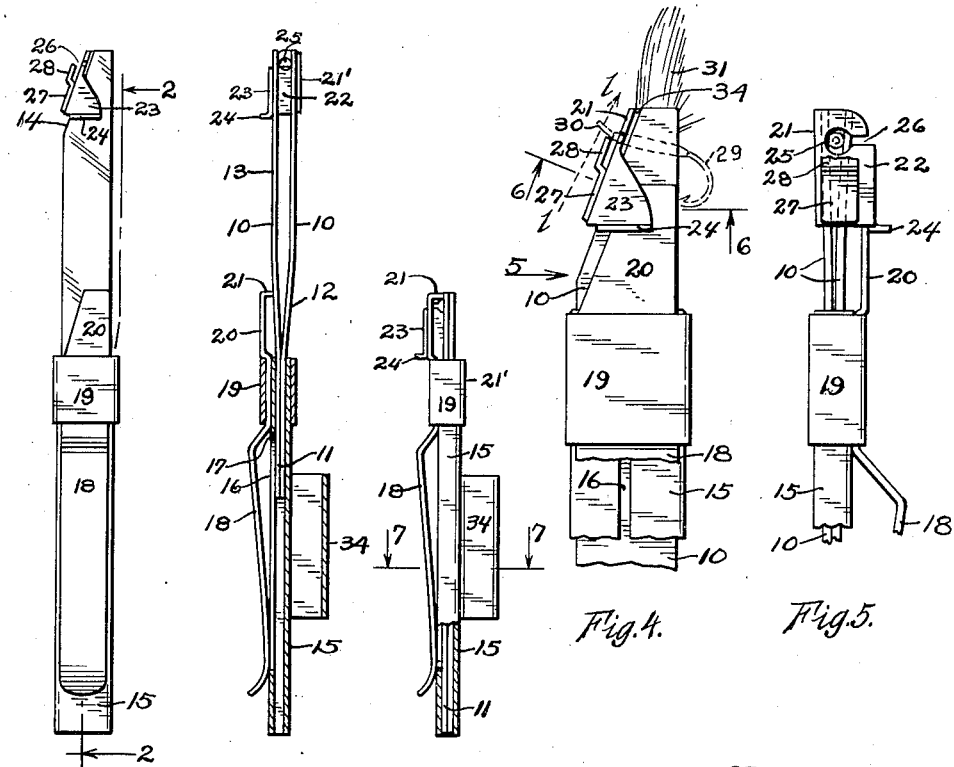
Figure 1 is a side elevation of the device comprising this invention.
Figure 2 is a section taken on line 2—2 Fig. 1.
Figure 3 is a side elevation, partly in section, showing the parts in closed position.
Figure 4 is a side elevation, to an enlarged scale showing the parts in operation position, the position of the dry fly being indicated by dotted lines.
Figure 5 is a view looking in the direction of arrow 5 in Fig. 4.
Figure 6:
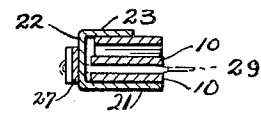
Figure 6 is a section taken on line 6—6 Fig. 4.

In Fig. 2 the jaws are shown as having divergent portions 12 that terminate in straight sections 13. The free ends are tapered as indicated at 14. The end 11 of the tweezer is inserted in an elongated sheath 15 whose inner dimensions are slightly greater than the corresponding dimensions of the tweezer so as to permit free sliding. The sheath 15 has a slot 16 extending in the direction of its length and the end 11 of the tweezer has a pin 17 that projects into the slot and serves as means for limiting the movement thereof relative to the sheath, the two extreme positions being shown in Figs. 2 and 3. When the tweezer element is in the position shown in Fig. 2 the free ends of the jaws 10 are spaced apart or open and when the tweezer element is telescoped into the sheath, the sides of the latter, engaging the inclined sections 12 of the clamping jaws serve to move the latter towards each other until the parts assume the position shown in Fig. 3.

A pocket clip 18 is secured to one side of the sheath by a ring 19. The strip of which the clip is formed, extends beyond the ring 19 and terminates in a part 20 that will be designated as the protector guide. The part 20 is tapered as shown and has its extreme end 21 bent inwardly so as to contact with the outer surface of the adjacent jaw 10.

Attached to the lower jaw (when viewed as in Fig. 1) is a plate 21' that will be designated as an eye piece. This plate has three angularly related sides, one of which is soldered to one of the jaws, another side, designated by numeral 22, extends across the space between the jaws and terminates in a side 23, of triangular shape, that lies parallel with the upper jaw. The lower edge of part 23 is bent outwardly so as to provide a thumb projection 24.

The side 22 has an eye or opening 25 and a narrow slot 26 extends through the material surrounding the opening. When the parts are in the position shown in Figs. 3, 4, 5, 8 and 9 the protector guide 20 is positioned between the side 23 and the jaw and acts somewhat as a wedge to produce a better clamping action.

Attached to side 22 of the eye piece is a leader guide 27, the lower end of which is soldered to the eye piece and the upper end 28 is bent outwardly so as to space its inner surface from the outside of the eye piece.

The operation of the device is as follows:

Let us assume that a fisherman desires to attach a new fly to his leader. The fly comprises a small hook 29 having an eye 30 at one end. The usual feathers or fibers 31 are secured to the hook to form the wings.

Figures 8, 9:
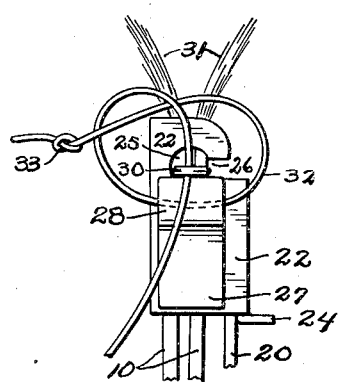
Figure 8 is a fragmentary view, similar to that shown in Fig. 5, and shows the leader in position to be tied to the fly.
Figure 9 is a view, similar to that shown in Fig. 8 and shows the leader in a slightly advanced position.
Figure 7:
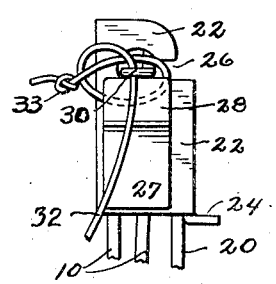
Figure 7 is a section taken on line 7—7 Fig. 3.

The hook is positioned between the open ends of the jaws with its eye 30 extending through the opening in the eye piece and resting on the upper end of the leader guide 28, in the manner shown in Figs. 4, 8, and 9. The tweezer element is now moved downwardly into the sheath to the position shown in Figs. 4 and 5 whereby the fly is clamped in position between the jaws. The leader 32 is now threaded through the eye 30, from below, as indicated by arrow 1—1 in Fig. 4. The end of the leader is now passed through the opening between the guide 28 and the eye piece, from left to right, as shown in Fig. 8. The end of the leader is now provided with a knot 33 and passed through the loop from the rear, after which tension is exerted on the leader and the size of the loops gradually decreased, as shown in Fig. 9, and finally the leader is tightened about the eye of the hook, thereby securing it to the leader.

The eye piece serves to keep the wings of the fly away from the eye of the hook during the tying operation. The leader guide directs the leader into the proper position.

After the hook has been securely tied to the leader the operator engages the thumb projection 24 and pulls the tweezer element partly out of the sheath and into the position shown in Figs. 1 and 2. The fly can now be removed, the leader passing through the slot 26 and out through the opening 34 between the eye piece and the jaw which has been provided for this purpose.

When the holder is in closed position, Fig. 3, the protector guide fills the space between the adjacent jaw and the side 23 of the eye piece and protects the latter from becoming bent. The edge of the protector guide also fits snugly against the inside of side 22 and prevents that portion of the eye piece that is above the slot 26 from being bent inwardly.

In order to employ the holder with the greatest advantage it should be secured to a stationary support and it has therefore been provided with a pocket clip 18 by means of which it can be attached to the side of a box, to a spectacle case, or to any other available support.

A loop 34 is attached to one side and a small pair of tweezers can be carried in this loop.

It is evident that many changes can be made in the structure shown without departing from the invention. The pocket clip can be omitted, the sheath can be shorter; the eye piece may be formed integral with one jaw, and applicant expects to make such changes as may be found desirable.

Having described the invention what is claimed as new is:

1. A dry fly holder comprising in combination a tweezer element having outwardly flexed clamping jaws of resilient flexible material, the free ends of the jaws being normally separated, an eye-piece attached to one jaw and extending across the space between the jaws, the eye-piece having an opening, there being a narrow slot through the material that surrounds the opening, a compressor element enclosing the jaws and movable therealong for effecting a movement of the free ends towards and away from each other, and means for limiting the movement of the compressor member in both directions.

2. A dry fly holder comprising in combination, a tweezer element having outwardly flexed clamping jaws of resilient flexible material, the free ends of the jaws being normally separated, an eye-piece attached to one jaw and extending across the space between the jaws, the eye-piece having an opening communicating with the space between the jaws, a leader guide positioned below the opening, the end nearest the opening being spaced from the eye piece, a tubular compressor element enclosing one end of the tweezer element and movable longitudinally thereon to effect an opening and a closing of the jaws, and means for limiting the longitudinal movement of the compressor element on the tweezer element.

3. A device in accordance with claim 2 in which the eye-piece has a portion lapping the outside of the other jaw member and in which the compressor element has its end bent and positioned to extend into the space between the jaw and the overlapping portion of the eye-piece.

4. A dry fly holder comprising in combination, a tweezer element formed from two flat jaw members of flexible resilient material, attached to each other at one end, the jaws being outwardly flexed and normally separated at their free ends, an eye-piece, of U-shape, having one side attached to one of the jaws and its other side lapping the outside of the other jaw, the portion connecting the two sides of the eye-piece having an opening communicating with the space between the jaws, the material surrounding the opening having a slot, a leader guide attached to the eye-piece at one end, the free end thereof terminating adjacent the opening and spaced from the eye-piece, a compressor element enclosing the tweezer element and slidable therealong for moving the jaws towards and away from each other, and means comprising a laterally bent portion of the compressor element for entering the space between the overlapping portion of the eye-piece and the jaw to produce a wedge action.

ARTHUR C. PARKHURST.